United States Patent [19]

Williams

[11] 3,768,090

[45] Oct. 23, 1973

[54] SIGNAL REGENERATOR CIRCUIT FOR PAGING RECEIVER

[75] Inventor: Ronald O. Williams, Chicago, Ill.

[73] Assignee: Stewart-Warner Corporation, Chicago, Ill.

[22] Filed: Mar. 8, 1972

[21] Appl. No.: 232,882

[52] U.S. Cl. ....... 340/311 R, 340/167 R, 340/164 R

[51] Int. Cl. .............................................. G08b 3/10

[58] Field of Search ................................ 307/268 R; 340/167 A, 164 R, 311 R

[56] References Cited

UNITED STATES PATENTS

| | | | |
|---|---|---|---|
| 3,299,404 | 1/1967 | Yamarone | 340/167 A |
| 3,551,815 | 12/1970 | Berman | 340/164 R |
| 3,368,153 | 2/1968 | Garde | 307/268 X |
| 3,376,431 | 4/1968 | Merrell | 307/268 X |
| 3,383,524 | 5/1968 | Garrahan | 307/268 X |
| 3,459,971 | 8/1969 | King | 307/268 R |
| 3,497,817 | 2/1970 | Ellis | 307/268 R |
| 3,652,950 | 3/1972 | Hilbert | 307/268 X |

*Primary Examiner*—Harold I. Pitts
*Attorney*—Augustus G. Douvas et al.

[57] ABSTRACT

A signal regenerator circuit for a selective paging receiver utilizes a differential amplifier to derive from a received subscriber address-bearing code signal a level-equalized code signal suitable for application to the receiver decoding circuitry. To make the width of the individual bits of the derived code signal independent of the received signal amplitude, an amplitude-dependent control voltage is applied to the differential amplifier to vary the slicing level of the amplifier with variations in signal amplitude. A clamping circuit is provided to stablize the slicing level, and a capacitor discharge circuit is provided to prevent low-frequency DC skewing by the large interstage coupling capacitance employed in the regenerator circuit.

3 Claims, 5 Drawing Figures

SIGNAL REGENERATOR CIRCUIT FOR PAGING RECEIVER

BACKGROUND OF THE INVENTION

This invention pertains to selective paging receivers, and more particularly to an improved signal regenerator circuit for use therein.

Selective paging systems have come into wide use for providing instantaneous communication with physicians, salesmen, repairmen and others whose work regularly takes them to locations where they may be out of contact with their offices for extended periods of time. With such systems it is only necessary that the subscriber carry on his person a radio receiver adapted to provide him with an audible alarm signal when an associated radio transmitter broadcasts a predetermined coded address signal. The subscriber then contacts his office by conventional communications means, e.g., public telephone, to ascertain the reason for which he is being paged.

One type of paging system which has proven particularly attractive is that wherein the subscriber address consists of a series of binary-coded pulses transmitted by narrow-band frequency modulation (NBFM) techniques on an assigned frequency in the 148–174 megahertz band. Each receiver in the system contains appropriate logic circuitry for analyzing the pulses to determine if its particular subscriber is being paged, and if so for sounding an audible alarm. One particularly attractive scheme for analyzing the binary pulses is to generate within the receiver in time coincidence with the received address code a local series of pulses constituting the subscriber's address code, and then to compare the pulses on a bit-by-bit basis.

To avoid false alarms and provide reliable response to subscriber address codes with such binary-code pulse-logic systems, it is desirable that the received address code signal approximate an idealized two-state binary signal as much as possible, even under extremely adverse high-noise weak-signal receiving conditions. Furthermore, not only should the address code signal be maintained at a constant amplitude, but the width of the individual bits of the signal should also be maintained constant notwithstanding amplitude variations in the received signal. It is to a signal conditioning circuit, or signal regenerator, for accomplishing these ends within the physical and battery drain constraints of a subscriber-carried paging receiver that the present invention is directed.

SUMMARY OF THE INVENTION

Accordingly, it is an object of the present invention to provide a new and improved signal regenerator circuit for a selective paging receiver.

It is a more specific object of the present invention to provide a new and improved circuit for maintaining the amplitude and bit width of a subscriber address-bearing code signal constant notwithstanding variations in the received signal level in a selective paging receiver.

In accordance with the invention, a selective paging receiver of the type adapted to recognize and respond to a received subscriber address-bearing code signal having a plurality of serially transmitted bits, incorporates a signal regenerator circuit comprising an amplifier channel adapted to operate in saturation for applied signals above a predetermined threshold level.

Translating means are provided for applying the address-bearing signal to the input of the amplifier channel, and output circuit means are provided for deriving from the amplifier channel a level-equalized subscriber address-bearing code signal. Means are also provided for developing a control effect representative of the amplitude of the received address-bearing signal, and means are provided for applying the control effect to the amplifier channel to vary the threshold level so as to maintain the width of the bits of the derived code signal substantially uniform notwithstanding amplitude variations in the received address-bearing code signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
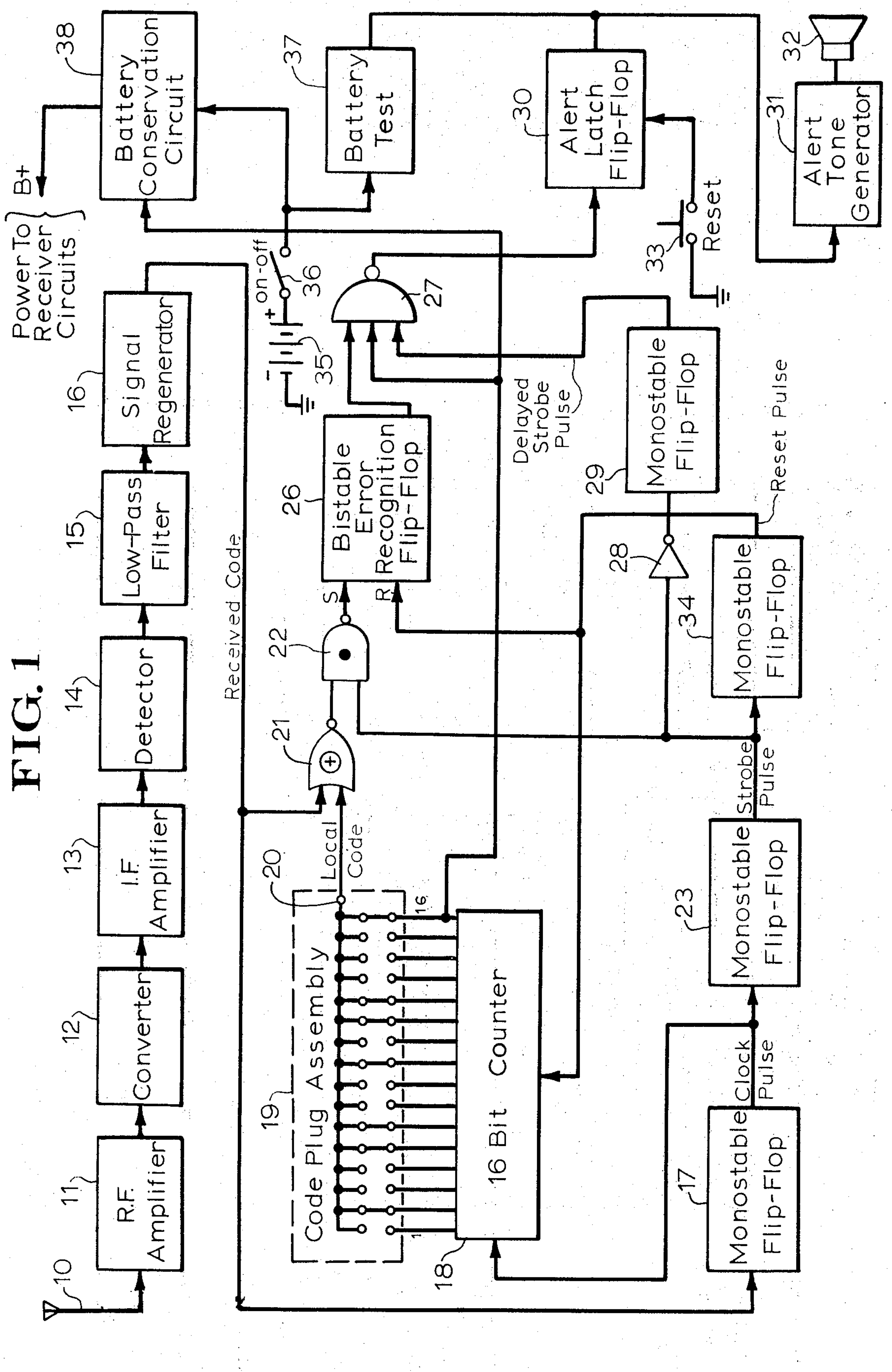
FIG. 1 is a block diagram of a receiver for a selective paging system embodying the present invention.

The signal regenerator circuit of the invention is shown in the embodiment of a VHF NBFM single-conversion superheterodyne paging receiver of the type adapted to receive and analyze subscriber addresses in the form of a series of binary coded pulses. Before considering the inventive circuit in detail it is desirable to have a general working knowledge of this receiver as a whole, and to this end a preferred paging receiver is depicted in block diagram form in FIG. 1.

A received signal in the 148–174 MHz band is intercepted by an antenna 10, amplified by a radio-frequency (RF) amplifier 11, and converted to an intermediate-frequency by a converter 12. These stages, aside from considerations of miniaturization and low current drain, are conventional in design and may employ one or more tuned circuits to provide necessary selectivity for rejecting adjacent channel transmissions. The resulting intermediate-frequency (IF) signal, which may in practice be centered at 7 KHz, is applied to an IF amplifier stage 13. This stage preferably comprises a plurality of amplifier stages and tuned filters to obtain a desired bandpass characteristic for accommodating the frequency shifts of the received address code signals. A preferred construction for this stage is covered in detail in the concurrently filed copending application of Joseph F. Yello, Ser. No. 232,881, which is also assigned to the present assignee.

The amplified intermediate-frequency output of IF amplifier 13 is applied to an FM detector 14, which in its simplest form may comprise a diode detector for converting the received binary coded signal into a digital signal comprising a sequence of high and low DC voltage levels. This signal is then applied to a 180 Hz low-pass filter 15 to prevent noise and extraneous non-address code-bearing signals from affecting the digital decoding process. Filter 15 in its simplest form may comprise a single RC filter network and one stage of compensating amplification.

To improve system reliability and performance the digital signal from filter 15 is applied to a novel signal regenerator stage 16 wherein the varying DC voltage levels from detector 14 are optimally shaped and amplitude-equalized for more reliable analysis by the address-recognition logic circuitry of the receiver. This stage automatically maintains a uniform code pulse width even in the face of signal amplitudes falling below the limiting threshold of IF amplifier 13, and in so doing contributes much to the operational reliability of the receiver. The exact functioning of this circuit will be covered in detail immediately following our present analysis of the receiver as a whole.

The processed address code signal from signal regenerator 16 is coupled to the decoder portion of the receiver wherein it is analyzed to determine whether it is intended for that particular receiver. As previously mentioned, this analysis is accomplished by generating an internal address code in time coincidence with the received address code, and then comparing the two on a bit-by-bit basis. If the addresses are identical, the receiver alert tone is sounded.

While the exact code format is somewhat arbitrary, we will assume for the sake of the present discussion that the address format consists of 16 bits each comprising a time slot of approximately 10 milliseconds. Allowing 90 milliseconds reset period between addresses, it follows that 250 milliseconds or 0.25 seconds will be required for each full address, and that four addresses may be sent per second. If one of the 16 bits is reserved for parity checking, i.e., having the total number of high or low bits always add up to an odd or even number for transmission monitoring purposes, and if it is desired to have a hamming distance of two, i.e., each address at least two bits different from any other address, the 16 bit format yields 32,768 valid address codes.

Figure 2:
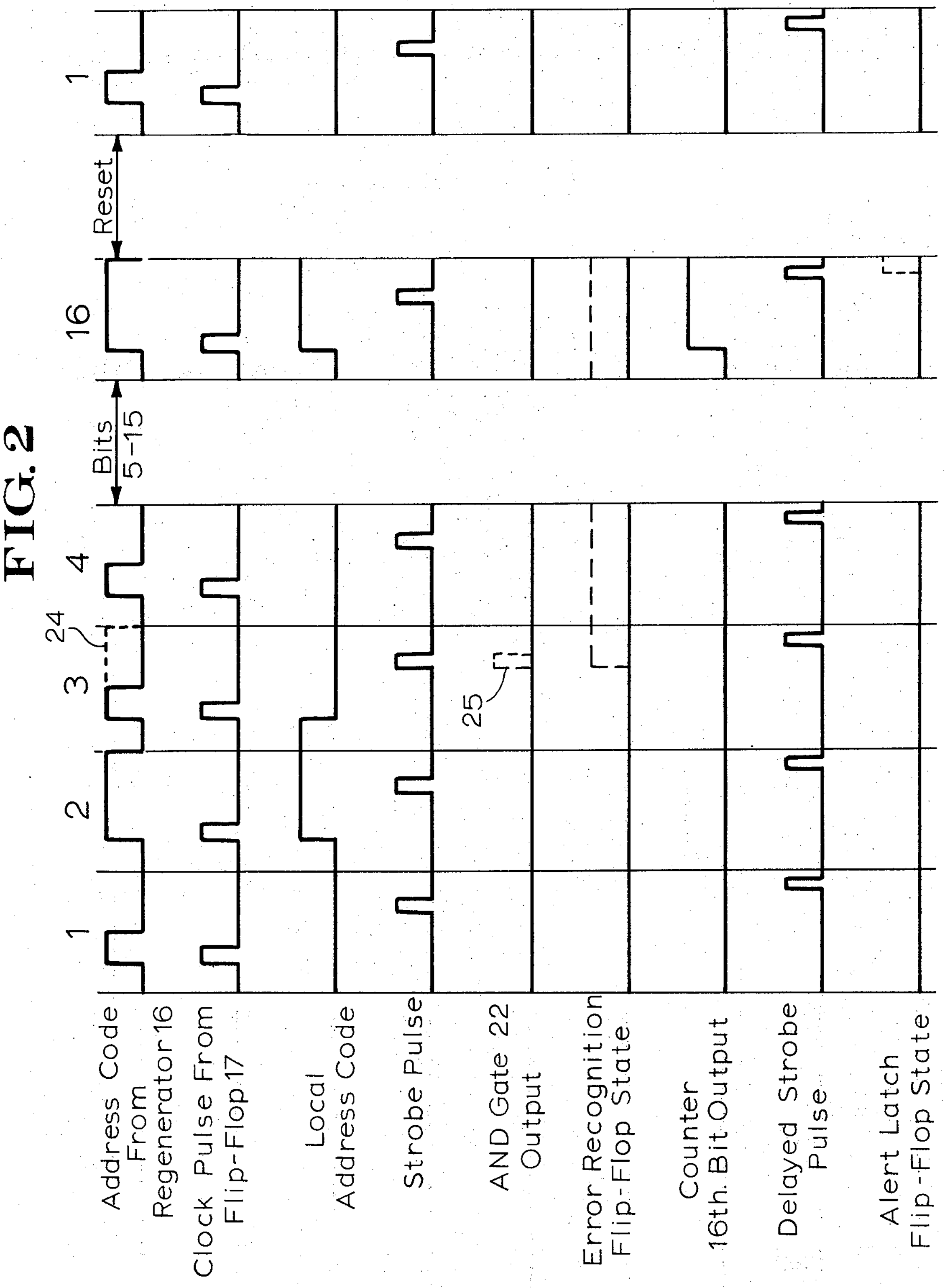
FIG. 2 is a graphical presentation of signal waveforms useful in understanding the operation of the receiver of FIG. 1.

Referring to FIG. 2, each of the 16 bits in the address code may be thought of as divided into four equal portions. In a valid address the first portion of each bit is always transmitted as a low and the second portion always transmitted as a high. The transition between low and high is recognized as a clock pulse by the decoding circuitry, and is used to synchronize the locally generated address with the received address. Specifically, in FIG. 1 the received address code is applied to a monostable flip-flop 17, which responds to the low to high transition to produce a clock pulse. The first 4 bits and the 16th bit of a representative address code as it would appear at the output of signal regenerator 16 is shown as the first trace, and the clock pulse output of flip-flop 17 as the second trace in FIG. 2.

The clock pulses from flip-flop 17 are applied to the input of a 16 bit counter 18. This counter has 16 output terminals which are cyclically rendered high, one at a time, as the counter advances from a reset or one count to a final or 16 count. The 16 output terminals are connected to respective ones of the 16 terminals on a code plug assembly 19, which is arranged to connect selected ones of the terminals to a common output terminal 20. Thus, depending on which of the counter outputs are connected to terminal 20, a high-low address code is generated on terminal 20 as the counter is advanced from one through 16 by the clock pulses from flip-flop 17. This is seen in the third trace of FIG. 2.

The locally generated address code at terminal 20 is applied to one input of a two input exclusive OR logic gate 21, and the received address code from signal regenerator 16 is applied to the other input. As is well known to the art, logic elements such as exclusive OR gate 21 have operating states which may be defined in terms of high and low voltage conditions; a high voltage condition being approximately the reference or supply voltage, generally in the order of 5.0 volts for the most common logic elements, and a low being some value less than reference, generally near or equal to 0 volts or ground potential. Exclusive OR gate 21 assumes a high state only when its two inputs do not agree, i.e., one is high and the other is low. Otherwise it exists in a low state, producing an appropriate low output signal. This is put to advantage in the present instance to compare the received and local address codes on a bit-by-bit basis, producing an output only when the two codes do not agree.

To prevent minor timing irregularities in the received and locally generated signals from causing erroneous address comparisons, the comparison process is restricted to a short period of time at the mid-point of the data in each bit, i.e., between the third and fourth portions of the bit. To this end, the output of exclusive OR gate 21 is connected to one input of a two-input AND gate 22, the other input of which is connected to a source of strobe pulses occurring between the third and fourth portions of each address bit. Since AND gate 22 can assume a high state only when neither one of its inputs is low, and a positive-polarity strobe pulse is necessary on its second input to fulfill this condition, bit-by-bit comparison in exclusive OR gate 21 is effectively prevented from having any effect except during the strobe pulse. The strobe pulse is generated by a monostable flip-flop 23, which is triggered by the clock pulse from flip-flop 17 and is arranged to provide a necessary delay of approximately one-half time slot between the clock pulse and the mid-point of the data.

As can be seen in the fourth and fifth traces of FIG. 2, there is no disagreement in the present example and thus no output from AND gate 22. However, the first trace in FIG. 2 includes an alternate high state for its fourth bit, as indicated by the broken line 24. Had this signal been transmitted instead, the received address code would not have agreed with the locally generated address code, and a strobe-coincident output pulse would have been generated at the output of AND gate 22, as shown by the dotted line 25.

Should an output pulse be produced by gate 22 at any time during the 16 bits of the address, a bistable error recognition flip-flop 26 is actuated from its normal or reset state to its set state. The output of this flip-flop, high only in the reset state, is applied to one input of a three input logical AND gate 27. Another one of the inputs to this gate is connected to the 16th count output of counter 18, and the remaining input is coupled to flip-flop 23 through a delay network comprising an inverter 28 and a monostable flip-flop 29. The latter connections prevent an output from AND gate 27 except when counter 18 is in its 16th or final counting state, and the 16th bit strobe pulse from flip-flop 23 has occurred. Inverter 28 and flip-flop 29 delay the strobe pulse applied to gate 27 sufficiently to insure that the local and received 16th bit code pulses will have been compared prior to recognition of an error.

When flip-flop 26 is in its reset state (i.e., no error in the codes), counter 18 is in its 16th or final counting state, and the strobe pulse for the 16th address bit has occurred, the output of AND gate 27 becomes high and forces an alert latch flip-flop 30 to transition to its latched state. This causes current to be supplied to an alert tone generator 31, which causes an alert tone in an associated loudspeaker 32. A reset switch 33 is provided to allow the subscriber to reset flip-flop 30 after receiving the alert.

If the local and received address codes do not agree, flip-flop 26 actuates to its set state and inhibits AND gate 27, preventing an alert from being sounded. In any event, approximately 40 milliseconds after the last address code bit a retriggerable monostable flip-flop 34 returns to its low state, and in so doing generates a reset pulse. This pulse is utilized to reset counter 18 and error recognition flip-flop 26 during the 90 millisecond reset period between code addresses.

Operating power for the receiver is provided by a battery 35, which is preferably a compact rechargeable type such as nickel-cadmium. The negative battery terminal is grounded, and the positive terminal is connected by means of a single-pole single-throw power switch 36 to a battery test circuit 37, and to the various receiver circuits by a battery conservation circuit 38. This circuit functions to periodically cycle the receiver on and off pending receipt and recognition of valid 16 bit address codes. Upon receipt of a valid address, the on-off cycle ceases and the receiver is maintained in a constant on state to permit normal reception of address codes. When valid address codes are no longer received, the conservation circuit reverts back to an on-off cycle after a short time delay. Since the on portion of the cycle is in practice only approximately one second long, and the off cycle approximately nine seconds long, the savings in battery energy is substantial. A preferred construction for this circuit is covered in detail in the concurrently filed copending application of the present inventor, Serial No. 232,878, which is also assigned to the present assignee.

Figure 3:
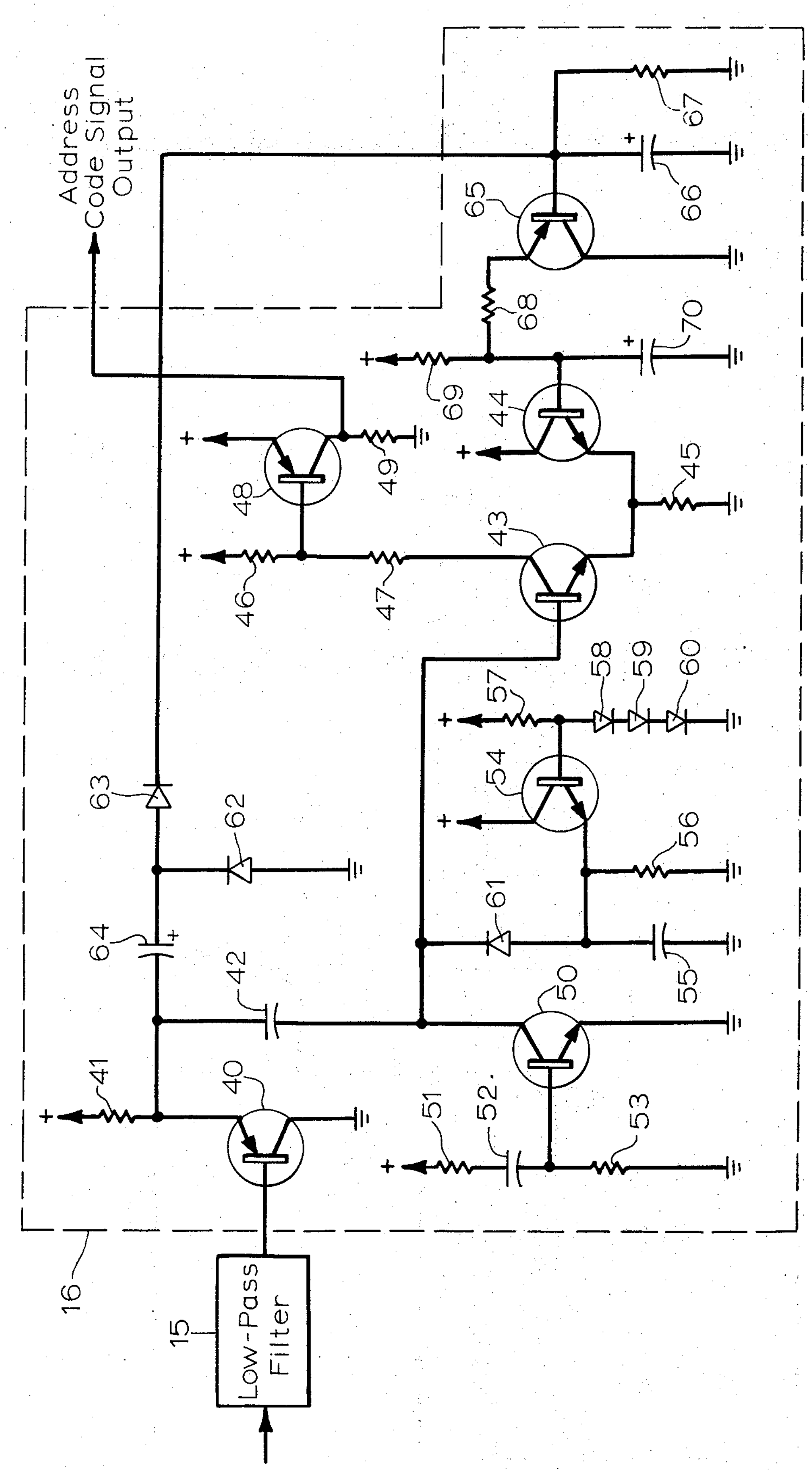
FIG. 3 is a schematic diagram of a signal regenerator circuit constructed in accordance with the invention.

Having considered the operation of the receiver as a whole, we are now in a position to return to the circuitry of the signal regenerator stage 16, which is detailed in FIG. 3 and to which the present invention is directed. The intermediate-frequency signal from low-pass filter 15 is applied to the base of a PNP transistor 40, which is connected in common collector configuration to provide additional amplification of this signal. The collector of transistor 40 is grounded, and the emitter is connected by an emitter load resistor 41 to receiver B+ and by a coupling capacitor 42 to the base of an NPN transistor 43. The emitter of transistor 43 is connected to the emitter of another NPN transistor 44, and the two emitters are connected to ground by a common emitter load resistor 45. The latter connection establishes transistors 43 and 44 in the well-known differential-pair amplifier configuration.

The collector of transistor 43 is connected to B+ by a pair of series-connected load resistors 46 and 47. The juncture of resistors 46 and 47 is connected to the base of a PNP transistor 48, which is connected in common-emitter configuration and biased to operate in saturation to provide, in conjunction with transistor 43, an amplifier channel for regenerating the address code signal. Specifically, the emitter of transistor 48 is connected directly to receiver B+ and the collector is connected to ground by a resistor 49. The regenerated output signal is derived across the latter resistor for application to the decoding circuitry of the receiver.

Provision in the form of an PNP transistor 50 is made for rapidly discharging capacitor 42 upon each initial operation of the receiver. The emitter of transistor 50 is grounded, the collector is connected to the base of transistor 43, and the base is connected to receiver B+ by the series combination of a resistor 51 and a capacitor 42, and to ground by a resistor 53. The operation of the aforedescribed circuit will be covered presently.

Also provided in regenerator circuit 16 is a clamping circuit for insuring that the received address code signals will always be referenced to a fixed reference voltage. Basically, this is accomplished by an NPN transistor 54, the collector of which is connected directly to receiver B+ and the emitter of which is connected to ground by the parallel combination of the capacitor 55 and a resistor 56. The base is connected to B+ by a resistor 57, and to ground by a trio of series-connected diodes diodes 58–60. The latter form a voltage reference for the base of transistor 54 and may be replaced in appropriate instances with known equivalents, such as zener diodes or the like. To provide the desired clamping action the emitter of transistor 54 is connected to the base of transistor 43 by a diode 61. The exact manner of operation of this circuit will be covered presently.

In accordance with the invention, the regenerator stage incorporates means for compensating for variations in the amplitude of the received address code signal. This is accomplished by means of a peak-detector circuit comprising two diodes 62 and 63, the juncture of which are connected to the emitter of transistor 40 by a capacitor 64. Diode 62 is connected to ground, and diode 63 is connected to the base of a PNP transistor 65. The base of transistor 65 is also connected to ground by the parallel combination of a capacitor 66 and a resistor 67, the collector is connected to ground and the emitter is connected to the base of transistor 44 by a resistor 68. The base of transistor 44 is connected to receiver B+ by a resistor 69 and by-passed to ground by a capacitor 70.

In operation, the received unprocessed address code signal is applied to transistor 40, which functions as a conventional signal amplifier. The amplified address code signal, appearing across load resistor 41, is coupled by capacitor 42 to the base of transistor 43, which is connected in differential-amplifier configuration with transistor 44.

For proper operation of the regenerator circuit, the signal applied to transistor 43 is clamped or referenced to a discrete voltage level by diode 61. The anode of diode 61 is maintained at a specific voltage level by transistor 54. Resistor 57 and the series-stacked diodes 58–60 establish a fixed voltage level on the base of the transistor 54, essentially independent of power supply and component variations. Since the current through the transistor is dependent on the voltage across the emitter-base junction, a voltage is necessarily developed across resistor 56 differing from that at the base only by the emitter-base junction voltage drop. Capacitor 55 by-passes resistor 56 to ground relative to the AC signal appearing on the cathode of diode 61.

To provide faithful translation of the relatively low-frequency components of the received address code signal, it is necessary that capacitor 42 have a large value of capacitance, in practice approximately 22 microfarads. Unfortunately, with periodic on-off cycling of the receiver by the aforementioned battery conservation circuit the DC charge developed across this capacitor undesirably interferes with proper functioning of the slicing circuit by requiring excessively long periods of time to assume the clamping level of diode 61. To remedy this situation, transistor 50 is made to conduct for a short period of time at the beginning of each receiver on cycle, thereby instantaneously discharging the capacitor. Conduction in transistor 50 is controlled by resistor 51 and capacitor 52, which form a differentiating network to cause current flow through the emitter-base juncture of the transistor each time receiver B+ is turned on. Resistor 53 completes the necessary base bias circuit for the transistor.

The amplified address code signal from transistor 43 appears across resistors 46 and 47, and that portion appearing across resistor 46 is applied to the base of transistor 48. This device is connected in common-emitter configuration, forming in conjunction with transistor 43 an amplifying channel for regenerating the applied address code signal.

Transistor 48 has only two possible operating states; cut-off or fully saturated. This achieves amplitude equalization of the received address code signal as it is translated through the amplifying channel, assuring optimum performance of the logic recognition circuitry in the receiver. It is this action which will subsequently be referred to as signal slicing. The level at which the transition from cut-off to saturated takes place is termed the threshold or slicing level, and the exact signal level at which this transition takes place is determined by the base bias on transistor 48 and the emitter bias on transistor 43. This in turn is dependent on the current flow through resistor 45, which we will see to be dependent on the condution level in transistor 44.

The action of transistor 44 is important, since it enables the regenerator circuit to maintain an address code output signal of constant amplitude and bit width irregardless of input signal amplitude variations. Specifically, a portion of the amplified address code signal appearing across resistor 41 is coupled by capacitor 64 to the juncture of diodes 62 and 63. These diodes operate in a manner well-known to the art to produce across capacitor 64 a DC voltage proportional to the amplitude of the signal across resistor 41. The DC voltage thus produced is applied to the base of transistor 65, which is intended to provide additional amplification for the control voltage prior to application to transistor 44. Capacitor 66 is provided to suppress transients, and resistor 67 provides a DC return path to ground for the base of transistor 65. The amplified control signal appears across resistors 68 and 69, and that portion developed across resistor 69 is applied directly to the base of transistor 44. Capacitor 70 is provided to achieve a time constant for preventing short-term variations in the address code signal level from unnecessarily changing the slicing level of circuit 16.

As the amplitude of the address code signal increases, the DC control voltage developed by diodes 62 and 63 increases. This decreases the conduction level of transistor 65 and increases the conduction level of transistor 44. The result is an increased voltage drop across resistor 45, and hence an increased slicing level in transistor 48 for the signal applied to transistor 43. This is very beneficial to the slicer stage, as will now be seen with the aid of FIGS. 4 and 5. The upper traces in FIGS. 4 and 5 each show a waveform representative of a portion of an unprocessed address code signal as it would appear at the output of low-pass filter 53. To aid the present explanation, the slope of the waveform has been somewhat exaggerated and the signal is shown at two different levels, designated high and low. The bottom traces in each case show the sliced or processes address code signal at the output of transistor 48.

Figure 4:
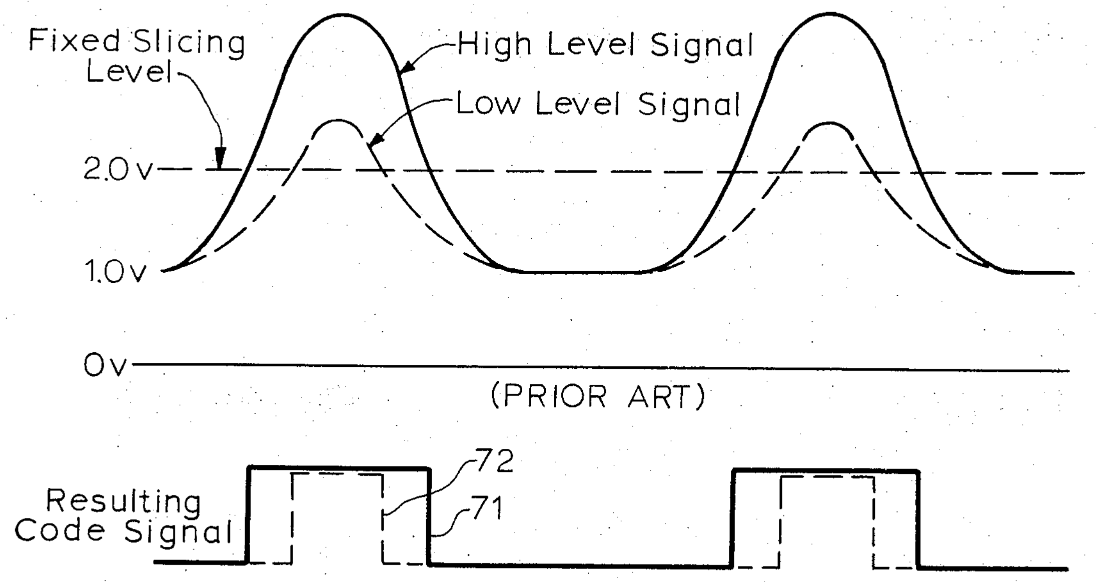
FIG. 4 is a graphical presentation of certain waveforms helpful in understanding the functioning of a signal regenerator circuit without pulse-width compensation.
Figure 5:
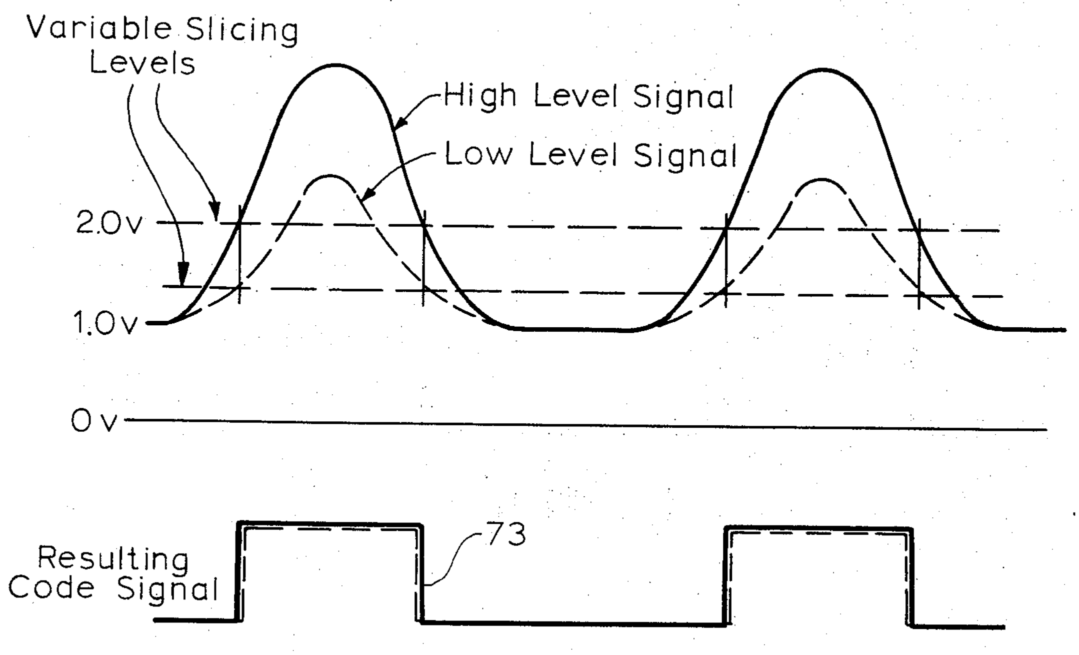
FIG. 5 is a graphical presentation of certain waveforms helpful in understanding the operation of the signal regenerator circuit of the invention.

As can be seen in FIG. 4, with a fixed slicing level the width of the bits in the processed address code signal vary with signal strength. For a fixed slicing level of 2.0 volts the wider trace 71 was produced with the higher signal level, while the narrower dotted trace 72 was produced with the lower signal level. In contrast, in FIG. 5 a single trace 73 of uniform width is produced for both the high and low signal levels because the slicing level was automatically lowered to accommodate the lower level input signal.

Thus, by virtue of a novel provision whereby the slicing level of the amplifying channel is varied with variations in the input signal level, the regenerator circuit of the present invention provides a uniform address code signal notwithstanding wide variations in signal amplitude and shape, such as could result from transmission irregularities and particularly adverse receiving conditions. Provision is made for clamping the signal to maintain accurate slicing levels, and to eliminate the possible DC level skewing effects of the large interstage coupling capacitor.

The circuit is compact and economical to construct, making maximum use of modern integrated circuit technology. It is engineered to provide minimum current drain and to make maximum possible use of existing circuitry and components within the receiver.

While particular emobidiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a selective paging receiver of the type having a power supply periodically activated for a short time period to energize the components of said receiver for enabling said receiver to receive and recognize a low frequency code signal formed from a plurality of serially received bits and amplified by a first amplifier for application to a signal regenerator circuit comprising:

first and second transistors each having a base circuit, a collector circuit and an emitter circuit;

a common impedance connected in series with each emitter circuit to define a differential amplifier configuration for said first and second transistors;

a third transistor having a base circuit coupled to the collector circuit of said first transistor with said third transistor operated in saturation in response to signals above a predetermined level appearing in said first transistor collector circuit for transmitting constant amplitude signals each corresponding to the width of said bits;

a fourth transistor having an emitter circuit coupled to the base circuit of said second transistor;

means including a capacitor interconnected between the output of said first amplifier and a pair of serially connected unidirectional circuit elements coupled to the base circuit of said fourth transistor for transmitting to said fourth transistor base circuit a d.c. signal corresponding to the amplitude of each said received bit to control the conduction level of said first transistor, for controlling the width of each signal transmitted by said third transistor;

another capacitor having a large time constant connected between the output of said first amplifier and said first transistor base circuit for transmitting a signal corresponding to each bit to said first transistor base circuit for enabling said first transistor to conduct for each received bit;

first clamp means connected between said other capacitor and said first transistor base circuit for ensuring each signal transmitted by said other capacitor to said first transistor base circuit has a predetermined minimum amplitude whereby said first transistor conducts only in response to the signal transmitted by said other capacitor having said minimum amplitude;

and other means connected intermediate said other capacitor and said first clamp means rendered momentarily conductive in response to each activation of said power supply for enabling said large time constant other capacitor to transmit a signal corresponding to said minimum amplitude substantially simultaneously with said activation.

2. The circuit claimed in claim 1 in which said first clamp means comprises a last transistor having a base, emitter and collector circuits, a plurality of serially connected unidirectional circuit elements connected between the base circuit of said last transistor and one terminal of said battery to establish a fixed voltage thereat for controlling the emitter voltage of said last transistor, and a last unidirectional circuit element interconnecting said other capacitor and said last transistor emitter circuit to shunt any signal below said emitter voltage from said first transistor base circuit.

3. The circuit claimed in claim 2 in which said other means comprises a shunt transistor having a base, emitter and collector circuits with said shunt transistor collector circuit connected intermediate said other capacitor and said last unidirectional circuit element, and a last capacitor connected intermediate said shunt transistor base circuit and said power supply for rendering said shunt transistor momentarily conductive in response to activation of said power supply to discharge said other capacitor through said shunt transistor emitter circuit.

* * * * *